Aug. 30, 1949.   P. H. KARLSSON ET AL   2,480,248
SEAL FOR HIGH-PRESSURE REACTORS

Filed Dec. 12, 1947   3 Sheets-Sheet 1

INVENTOR.
Per Hilmer Karlsson
Arthur Jensen

ATTORNEY

Aug. 30, 1949.  P. H. KARLSSON ET AL  2,480,248
SEAL FOR HIGH-PRESSURE REACTORS
Filed Dec. 12, 1947  3 Sheets-Sheet 2
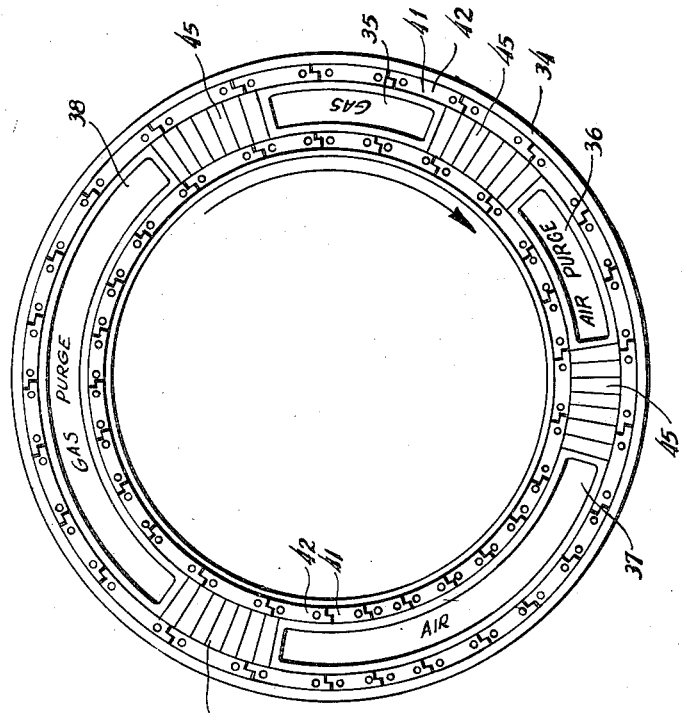
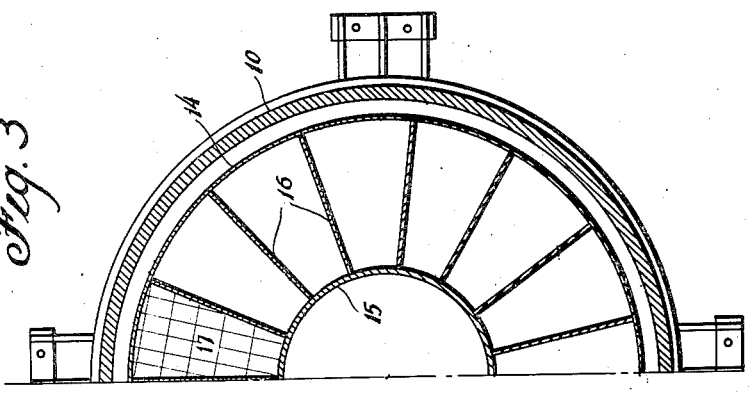
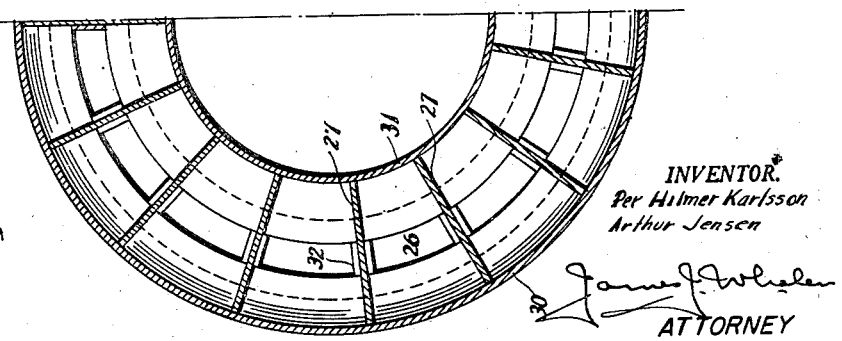
INVENTOR.
Per Hilmer Karlsson
Arthur Jensen
ATTORNEY

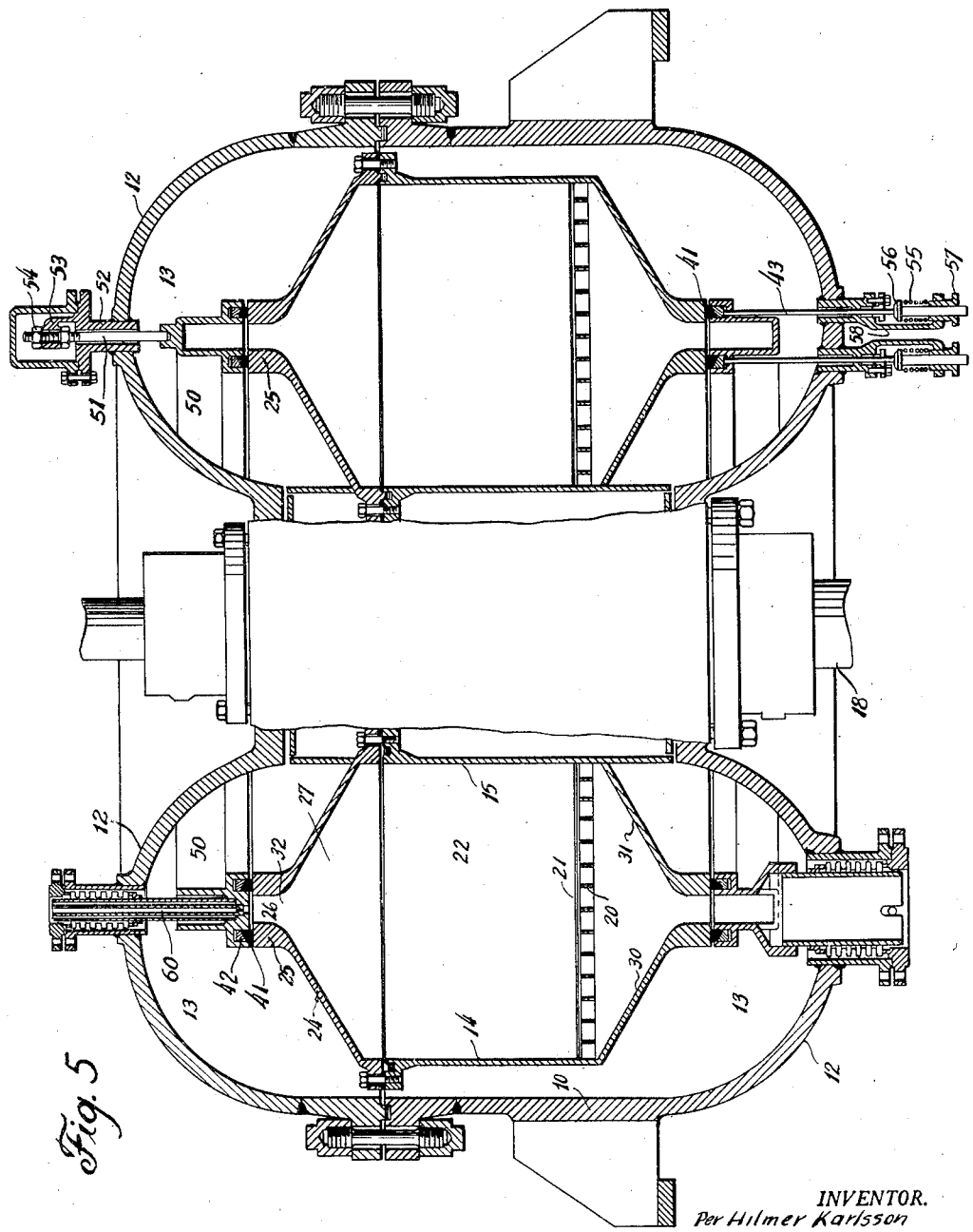

Patented Aug. 30, 1949

2,480,248

UNITED STATES PATENT OFFICE 2,480,248

SEAL FOR HIGH-PRESSURE REACTORS

Per Hilmer Karlsson and Arthur Jensen, Wellsville, N. Y., assignors to The Air Preheater Corporation, New York, N. Y.

Application December 12, 1947, Serial No. 791,366

4 Claims. (Cl. 23—288)

1

The present invention relates to regenerative apparatus such as chemical reactors in which streams of hydro-carbon gas, steam and air are passed over a body of catalytic material carried by a rotor turning within a housing. The invention is particularly directed to improved forms of sealing means between the stationary housing provided with fluid inlets and outlets and moving rotor therein to preclude the flow of gaseous fluids in the housing spaces around and between fluid spaces of the rotor.

The reactor embodied in the present invention is constructed to withstand high pressures, and has a rotor comprising a cylindrical shell divided into sector-shaped compartments by radial partitions. These compartments in the reactor contain masses of catalytic material and in the operation of the reactor while the material in some compartments is contacted by a stream of hydrocarbon gas purging steam flows through adjacent compartments to remove the traces of hydrocarbon gas while air is admitted to other compartments to burn off carbon remaining on the catalytic material and in still other compartments the products of combustion are purged therefrom by blowing steam through them. Inlet and outlet connections are provided on the reactor housing for supplying the various fluids to the rotor and since the latter turns with respect to the housing to bring compartments successively into line with the various fluid connections it is necessary to provide radial seals for obviating mingling of the fluids by cross-flow between adjacent compartments and circumferential seals are necessary to prevent the leakage of fluid from the inlet and outlet connections into the interior space within the housing surrounding the rotor.

The sealing problem is accentuated by the high pressures under which fluids flow through the rotor and an object of the invention is to provide seals which will withstand these pressures and obviate leakage.

The invention will be best understood on consideration of the following detailed description of illustrative embodiments thereof when read in conjunction with the accompanying drawings in which:

Figures 2 and 3 are sectional plan views on the correspondingly designated section lines in Figure 1.

Figure 4 is a sectional view on the line 4—4 in Figure 1 showing in plan view the stationary elements of the sealing means at one end of the housing.

Figure 5 is a view similar to Figure 1 illustrating a modified construction for the inlet and outlet connections.

Figure 1:
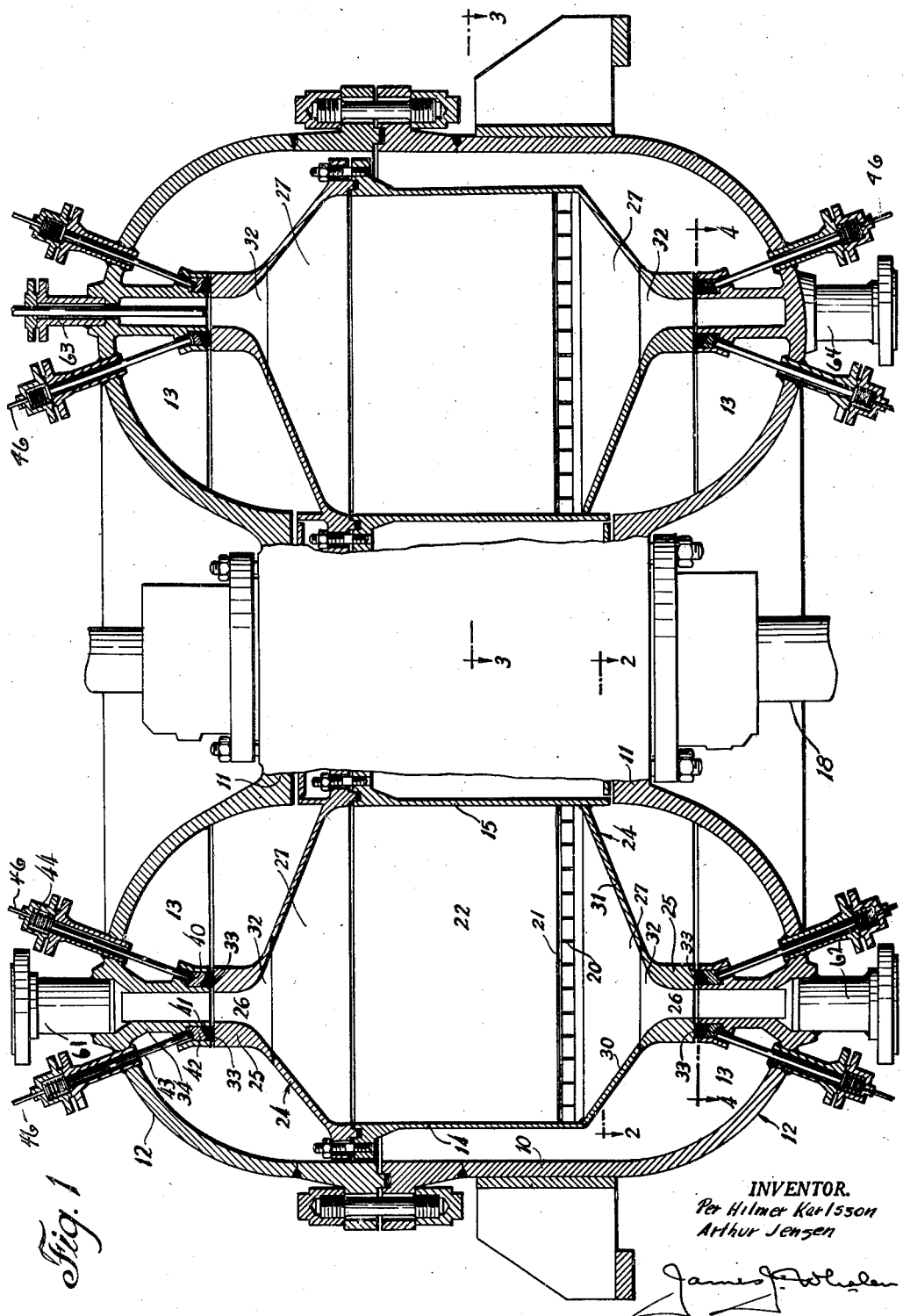
Figure 1 is a sectional elevation of a reactor embodying the present invention.

The reactor embodying the invention comprises a generally cylindrical thick metallic shell 10 with end plates 11 each formed with a raised circular dome 12 of semi-circular cross-section so that at either end of the housing there is an annular chamber 13 constituting an extension of the cylindrical body. Located within the reactor housing 10 is a cylindrical rotor comprising circularly bent plates 14, 15 connected by radial partitions 16 dividing its interior into sector-shaped compartments 17, Figs. 2, 3. A rotor post 18 to which a motor and reduction gearing (not shown) are connected, provide means for turning the rotor slowly about its axis within the reactor housing 10. Near the bottom of the rotor compartments 17 are grids 20 carrying screens 21 upon which a bed of catalytic material 22 is supported in each of the rotor compartments.

At each end of the rotor the compartments 17 are closed by end covers 24 formed inwardly of the outer circumferential edges with annular necks 25 extending into the annular chambers 13 at the ends of the housing 10. The necks 25 are formed with annular passages 26 through which fluids are supplied to and taken from the rotor compartments 17. The partitions 16 separating the rotor compartments are extended by plates 27 (Fig. 2) from the end planes of its cylindrical section outwardly through the convergent walls 30, 31 bounding the annular parts of the end plates 24 and by plates 32 in passage 26 to the outer end faces 33 of the necks 25.

As mentioned above the end plates 12 of the reactor housing 10 are formed with annular bulges 13 accommodating the annular necks 25 at the ends of the rotor. Projecting from the interior wall of each end plate 12 is an annular distributor ring 34 formed at intervals with passages 35, 36, 37, 38 each of greater circumferential extent than the widths of several rotor compartments 17. Flanged pipe connections (as at 61 to 64 in Figure 1) lead to these passages so that the various fluids may be admitted to and taken from the rotor compartments through these arcuate passages. Thus, projecting from the interior wall from each end plate 12 of the housing opposite the annular neck portion 25 of the rotor are sector-shaped distributing nozzle passages 35 to 38 communicating with the exterior pipe connections 61 to 64 for supplying various fluids to the rotor.

To seal the connection between the annular neck 25 of the rotor and the distributor ring 34 as the rotor turns, the rings 34 have arcuate grooves 40 formed therein at either side of the various fluid passages 35 to 38. Mounted within each groove with their outer ends contacting the finished end faces of the rotor necks 25 are several sealing shoes 41 of graphite or other suitable material which, as illustrated, are of arcuate shape and have rabbeted ends so that a fluid seal is formed between the various sections or shoes that comprise a sealing member extending along both circumferential edges of the fluid ports in the distributing ring 34. Beneath each group of graphite sealing shoes 41 is a metallic backing strip 42. The contacting faces of the backing strips and shoes are cut on the bias or diagonal so that pressure applied to the backing strips in a direction axially of the rotor tends to move the graphite sealing shoes 41 out of their mounting grooves and hold them in good sealing contact with the finished end surfaces 33 on the annular neck portions 25 of the rotor. To press the backing strips 42 and sealing shoes 41 against the rotor necks 25 thrust rods 43 have their inner ends extending into the grooves 40 and with their outer ends projecting through end plates 12 to connect with Sylphon bellows 44 to which pipes 46 are connected to supply them with fluid under pressure.

As the various compartments of the rotor turn from alinement with one arcuate fluid passage to another that is spaced circumferentially therefrom in the distributor ring 34, cross-flow of the fluids between adjacent compartments 17 is prevented by radial sealing shoes 45 of wedge form located in recesses of the ring 34 in the spaces between adjacent arcuate passages 35 to 38 for various fluids. Thus the sealing shoes 41 mounted along the edges of the fluid passages in ring 34 act as circumferential seals to prevent the escape of fluid from the inlets on the reactor housing to the space between the rotor and housing in such manner as to by-pass the compartments of the rotor. At the same time the wedge-shaped seals 45 in the intervals between the fluid passages function as radial seals to prevent mixture of fluids by flow between compartments in directions across the ends of the rotor.

In the form shown in Fig. 5 the distributor rings 50 are not integral with the ends 12 of the housing 10 but are independent and adjustable in directions axially of the reactor within the end chambers 13 of the rotor housing. The rings 50 are supported at intervals by rods 51 which extend through bonnets 52 in the rotor end plates 12 and are threadedly adjustable at their outer ends in brackets 53 supported on the housing so that by adjusting the nuts 54 the axial position of the distributor rings 50 may be regulated with respect to the annular neck portions 25 at the end of the rotor. In this form the sealing shoes 41 are shown as maintained in contact with the end surfaces of the neck portions of the rotor by similar rods 43 which instead of being biassed towards the rotor by fluid pressure are subjected to the action of tension springs 55 acting between collars 56 on the rods and the adjustable nuts 57 threaded in the brackets 58 in which the outer ends of the rods are guided.

The streams of air for burning the carbon from the catalyst and for supplying steam to purge hydrocarbon gas from compartments 17 are made through flange pipe connections to the distributor rings 50 in alinement with the appropriate arcuate sections 36, 37, 38 of the nozzle ring. The hydrocarbon gas, however, is admitted through passage 35 to the rotor as shown in Fig. 5 through a pipe 60 of small diameter which extends through the upper end plate 12 of the rotor and into one ring 50 to a position close to the end face of the annular neck 25 on the rotor and thus projects the greater part of the way through the distributor ring 50.

It should be noted that by utilizing the Sylphons 44 to maintain the shoes 41 in contact with the end surfaces 33 on the rotor neck it is possible to eliminate stuffing boxes since the thrust rods 43 do not project through the housing. The diaphragms of the Sylphons effectively close the openings in the housing and the pressure on the outer face of the diaphragm may be made to equal the pressure existing within the reactor so that there is no possibility of leakage.

What is claimed is:

1. In regenerative apparatus; a cylindrical rotor having compartments carrying material to be contacted by fluids; a housing enclosing said rotor; a closure plate at either end of the rotor; an annular neck portion of smaller diameter than the rotor projecting toward said housing from each closure and formed with circumferentially spaced passages leading to said compartments, the end face of each neck portion being formed to provide smooth sealing surfaces adjacent the circumferential margins of said passages; tubular fluid supply and discharge connections projecting into said housing and connected with fluid distributing rings having circumferentially spaced arcuate passages disposed in axial alinement with the passages in the annular neck portions of said rotor, said rings being formed with arcuate grooves extending inwardly from their end faces along the circumferential margins of said passages in alinement with the aforesaid sealing surfaces on the neck portions of said rotor; arcuately shaped sealing shoes mounted in said grooves; thrust rods projecting through the housing with their inner ends extending into said grooves for applying force to said shoes to maintain them in yielding contact with the sealing surfaces on said rotor; and individual means for applying pressure to said rods in a direction to maintain said shoes in contact with the sealing surfaces of the neck portions of said rotor.

2. In regenerative apparatus; a cylindrical rotor having compartments carrying material to be contacted by gaseous fluids; a housing enclosing said rotor; a closure plate at either end of the rotor; an annular neck portion of smaller diameter than the rotor projecting toward said housing from each closure and formed with circumferentially spaced passages leading to said compartments, the end face of each neck portion providing smooth planar sealing surfaces adjacent the circumferential margins of said passages; tubular fluid supply and discharge connections projecting into said housing and connected with fluid distributing rings disposed opposite the neck portions on said rotor and formed with circumferentially spaced arcuate fluid passages alined with the passages in the annular neck portion of said rotor, said rings being formed along the circumferential margins of said passages with arcuate grooves extending inwardly from their end faces in alinement with the aforesaid sealing surfaces on the neck portions of said rotor; arcuately shaped sealing shoes mounted in said grooves; thrust rods projecting through the housing with their inner ends extending into said grooves for applying force to said shoes to maintain them in yielding contact with the sealing surfaces on said rotor; and individual fluid Sylphons for applying pressure to said rods in a direction to maintain said shoes in contact with the sealing surfaces of the neck portions of said rotor.

3. In regenerative apparatus; a cylindrical rotor having compartments carrying material to be contacted by fluids; a housing enclosing said rotor; a closure plate at either end of the rotor; an annular neck portion of smaller diameter than the rotor projecting toward said housing from each closure and formed with circumferentially spaced passages leading to said compartments, the end face of said neck portion providing a smooth sealing surface adjacent the circumferential margins of said passages; tubular fluid supply and discharge connections projecting into said housing and connecting with fluid distributing rings having circumferentially spaced arcuate passages disposed in axial alinement with the passages in the annular neck portions of said rotor, said rings being formed with arcuate grooves extending inwardly from their end faces along the circumferential margins of said passages in alinement with the aforesaid sealing surfaces on the neck portions of said rotor; groups of arcuately shaped sealing shoes mounted in said grooves; backing strips mounted beneath said shoes; thrust rods projecting through the housing with their inner ends extending into said grooves for applying force against said backing strips to maintain the related group of shoes in yielding contact with the sealing surfaces on said rotor; and individual tension springs for applying pressure to said rods in a direction to maintain said shoes in contact with the sealing surfaces of the neck portions of said rotor.

4. Regenerative apparatus as recited in claim 2 wherein said distributing rings are formed with recesses extending substantially across their width in the intervals between said arcuate passages therein; radially extending wedge shaped seal shoes mounted in said recesses; and means for maintaining said wedge shaped shoes in sealing engagement with the sealing surfaces on the annular neck portions of said rotor.

PER HILMER KARLSSON.
ARTHUR JENSEN.

No references cited.